United States Patent [19]

Fukami et al.

[11] Patent Number: 5,130,958
[45] Date of Patent: Jul. 14, 1992

[54] METHOD OF AND APPARATUS FOR OVERWRITTING A MAGNETO-OPTIC DISK

[75] Inventors: Tatsuya Fukami; Kazuhiko Tsutsumi; Takashi Tokunaga, all of Amagasaki, Japan

[73] Assignee: Mitsubishi Denki Kabushiki Kaisha, Japan

[21] Appl. No.: 413,165

[22] Filed: Sep. 27, 1989

[30] Foreign Application Priority Data

Oct. 3, 1988 [JP] Japan .................... 63-249370

[51] Int. Cl.5 .................. G11B 11/00; G11B 5/02; G11B 3/70
[52] U.S. Cl. ...................... 369/13; 369/275; 369/284; 360/59
[58] Field of Search ............ 360/59, 112; 365/122; 369/275.2, 284, 13

[56] References Cited

U.S. PATENT DOCUMENTS

| | | | |
|---|---|---|---|
| 4,569,881 | 2/1986 | Freese et al. | 365/122 |
| 4,649,519 | 3/1987 | Sun et al. | 365/122 |
| 4,679,180 | 7/1987 | Kryder et al. | 369/13 |
| 4,753,853 | 6/1988 | Sato et al. | 428/694 |
| 4,771,347 | 9/1988 | Horimai et al. | 369/13 |
| 4,855,975 | 8/1989 | Akasaka et al. | 369/13 |
| 4,926,402 | 5/1990 | Masarkawa | 364/13 |

FOREIGN PATENT DOCUMENTS 0285461 10/1988 European Pat. Off. .......... 369/13
0772346  3/1989 Japan .

OTHER PUBLICATIONS

Direct Overwrite by Light Power Modulation on Magneto-Optical Multi-layered Media—Saito—Japanese Journal of Applied Physics vol. 26—1987.
High Speed Overwritable Magneto—Optic Recording—Nakao et al Japanese Journal of Applied Physics—vol. 26, 1987.

Primary Examiner—Stuart S. Levy
Assistant Examiner—Tan Nguyen
Attorney, Agent, or Firm—Wolf, Greenfield & Sacks

[57] ABSTRACT

Information on a spinning magneto-optic disk is overwritten by illuminating a spot on a track on the disk with an erasing beam in the presence of a biasing magnetic field, and illuminating another spot on the same track with a writing beam during the same revolution of the disk. The erasing beam and writing beam can be focused through the same lens. The erasing beam erases all bits to the same known value, so it is not necessary to control the writing beam according to the old values of the bits. Benefits include simpler control logic and less stringent positioning requirements than in the past.

23 Claims, 2 Drawing Sheets

F I G. 3
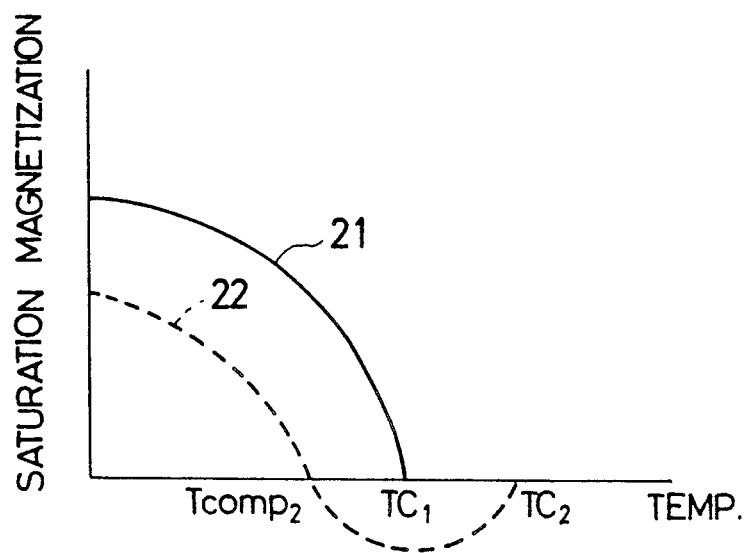
F I G. 4
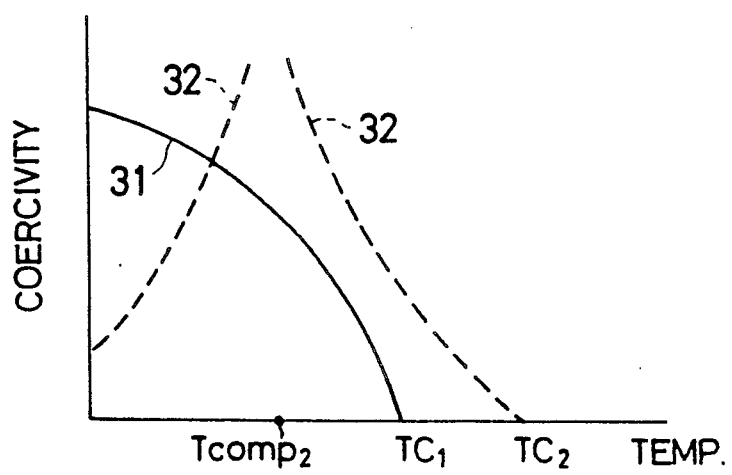

METHOD OF AND APPARATUS FOR OVERWRITING A MAGNETO-OPTIC DISK

BACKGROUND OF THE INVENTION

This invention relates to a method of and apparatus for overwriting information on a magneto-optic disk.

Due to their ruggedness, removability, and extremely large capacity, optical disks are highly attractive as information storage media. So-called write-once optical disks are used for archival storage of document and image information. Magneto-optic disks offer the further advantage of erasability, enabling their contents to be modified by erasing old information and writing new information in its place. For maximum speed, a magneto-optic disk should be directly overwritable; that is, it should be possible to erase information in a track or sector and write new information in the same track or sector during a single revolution of the disk. It is also desirable that the overwriting be accomplished by modulating a beam of light rather than by modulating a magnetic field, since a light beam can be modulated at high frequencies without producing troublesome electromagnetic noise.

A type of magneto-optic disk that permits direct overwriting by a modulated light beam comprises two magnetic layers: a storage layer and a reference layer. Bits of information are stored as the direction of magnetization of domains called bit cells in the storage layer. The reference layer normally has the same magnetic orientation as the storage layer, but also has the property that its direction of magnetization reverses at high temperatures. The magnetic characteristics of the two layers are controlled so that at room temperature the magnetic orientation of the storage layer is transferred to the reference layer, but at a higher temperature the magnetic orientation of the reference layer is transferred to the storage layer.

A prior-art method for overwriting bits on such a magneto-optic disk is to illuminate their bit cells with a single light beam as the disk spins. When a bit cell enters the beam spot it is momentarily heated. As its temperature rises, first the net magnetic orientation in the reference layer reverses, then the reversed orientation is transferred to the storage layer. After the bit cell leaves the beam spot and its temperature falls, the storage layer retains its new, reversed orientation. As the temperature approaches room temperature the reference layer first reverses to its old orientation, but then acquires the new orientation of the storage layer.

To write new information by this method, first the old information on the disk is read and compared with the new information to find those bit cells in which the new value differs from the old. The beam is switched on for those bit cells, and switched off for bit cells in which the old and new values are the same.

One problem with this method is that the need to compare the old information with the new information and modulate the beam according to whether they are different or the same unnecessarily complicates the overwriting process and its control logic. It would be simpler to modulate the beam according to the new information alone.

Another problem is that the beam must be switched on precisely over the bits to be changed, and switched off precisely over the bits that remain the same. Any beam positioning error may result in illumination of the wrong bits, hence in writing of incorrect information.

The minimum length of a bit cell on a magneto-optic disk is currently shorter than one micrometer, e.g., about 0.5 micrometers, so the beam illumination must be controlled with a precision considerably exceeding one micrometer. Equipment capable of such high positioning accuracy is difficult and expensive to manufacture.

SUMMARY OF THE INVENTION

It is accordingly an object of the present invention to write new information directly over old information according to the new information alone, without having to read the old information.

According to the invention, a spot is illuminated on a track on the disk with an erasing beam of substantially constant intensity in the presence of a substantially constant biasing magnetic field, and another spot is illuminated on the same track with a writing beam. The intensity of the writing beam is modulated between a high level and a low level according to the information to be written. Illumination by the erasing beam and illumination by the writing beam are performed during the same revolution of the disk. The erasing beam and writing beam are preferably focused through a single lens.

BRIEF DESCRIPTION OF THE DRAWINGS

FIG. 3 is a graph of the magnetization vs. temperature characteristics of the magnetic layers in FIG. 2.

FIG. 4 is a graph of the coercivity vs. temperature characteristics of the magnetic layers in FIG. 2.

DETAILED DESCRIPTION OF THE INVENTION

A novel method of and apparatus for overwriting information on a magneto-optic disk will be described with reference to FIGS. 1 to 4.

Figure 1:
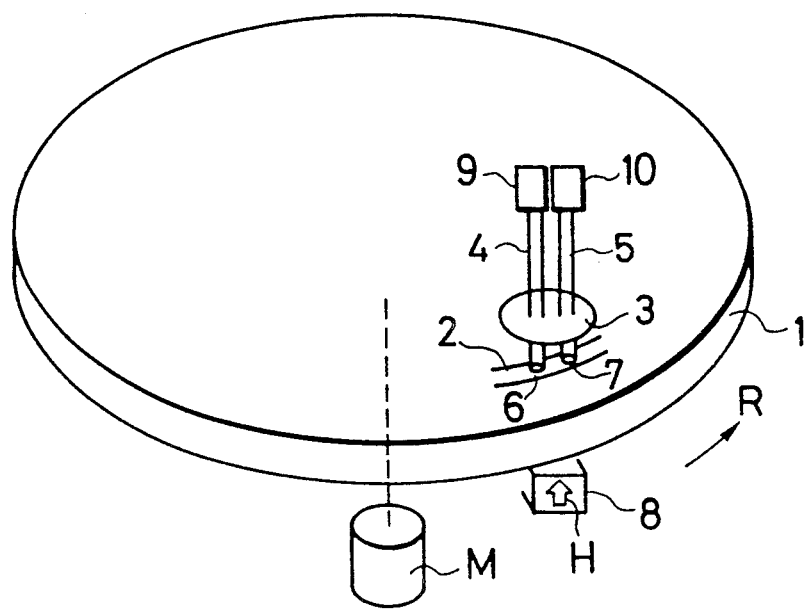
FIG. 1 is a schematic diagram of a magneto-optic disk apparatus, illustrating a novel overwriting method.

FIG. 1 is an oblique view illustrating a magneto-optic disk apparatus in which the novel method is employed. The device comprises a magneto-optic disk 1 having one or more concentric tracks 2, which may be delineated by physical grooves in the surface of the magneto-optic disk 1. A lens 3 focuses two light beams onto separate spots on the same track 2. The first beam is an erasing beam 4 generated by a first beam emitting device 9 such as a laser diode not shown in the drawing. The second beam is a writing beam 5 generated by a second beam emitting device 10. The lens 3 focuses the erasing beam 4 onto an erasing spot 6, and the writing beam 5 onto a writing spot 7. A bias magnet 8 for generating a substantially constant biasing magnetic field is disposed under the magneto-optic disk 1, below the erasing spot 6 and the writing spot 7. The bias magnet 8 may be a permanent magnet. The biasing magnetic field is oriented in, for example, the up direction.

A track 2 is divided into bit cells, each storing one bit of information. A track 2 may also be subdivided into sectors comprising a plurality of consecutive bit cells, adjacent sectors being separated by gaps.

The disk is spun in the direction of arrow R by a motor M so that the bit cells successively move past a location of erasure, at which the erasing spot 6 is formed, and then a location of writing, at which the writing spot 7 is formed.

The biasing magnet 8 is large compared with the size of the spots 6 and 7, and the separation between them, so they cover both the location of the erasure and the location of writing. But what is critical is that the biasing magnetic field is formed at the location of the erasure, or where the disk is cooled after being heated by the erasing spot.

Figure 2:
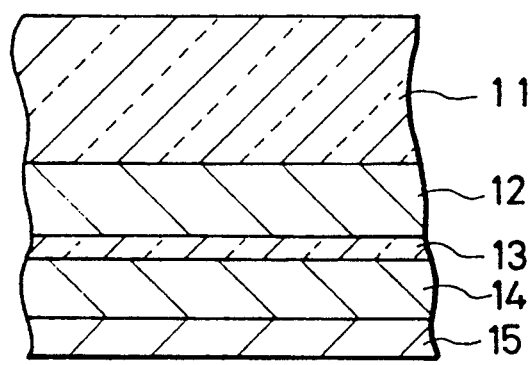
FIG. 2 is a sectional view of the magneto-optic disk in FIG. 1.

FIG. 2 is a more detailed sectional view of the magneto-optic disk 1, which comprises four layers. Shown at the top in FIG. 2 is a transparent substrate 11 comprising a material such as glass or plastic. Next is a storage layer 12 comprising a magnetic material in which bit values are stored as magnetic orientations perpendicular to the plane of the disk. For example, the up orientation represents a zero value and the down orientation represents a one value. Bit values are read by the Kerr rotation effect, which shifts the polarization angle of an incident beam of linearly polarized light.

Underlying the storage layer 12 is a non-magnetic layer 13 comprising, for example, a dielectric material, then a reference layer 14 comprising a magnetic material, then a protection layer 15. The function of the non-magnetic layer 13 is to prevent quantum exchange coupling between the magnetic materials in the storage layer 12 and the reference layer 14, so that only static magnetic forces operate between these two layers. The function of the protection layer 15 is to protect the magnetic layers from oxidation and mechanical damage. The function of the reference layer 14 will be explained later.

FIG. 3 is a diagram of the magnetization vs. temperature characteristics of the storage layer 12 and the reference layer 14. Temperature is represented on the horizontal axis, with room temperature at the left end and increasing temperature to the right. Magnetization is represented on the vertical axis, with zero magnetization at the level of the horizontal axis, magnetization in the up direction shown above the horizontal axis, and magnetization in the down direction shown below the horizontal axis.

The curve 21 is the magnetization-temperature characteristic of the storage layer 12. The storage layer 12 comprises, for example, a ferrimagnetic material such as a terbium-iron alloy, the magnetization of which diminishes with increasing temperature up to the Curie temperature $TC_1$, at which temperature all magnetization is lost.

The curve 22 is the magnetization-temperature characteristic of the reference layer 14. The reference layer 14 comprises, for example, a ferrimagnetic material such as a gadolinium-terbium-iron alloy having two oppositely magnetized components. At room temperature one of these components has larger magnetization than the other, so there is a net magnetization in, for example, the up direction. As the temperature rises the magnetization of both components decreases, but at different rates, so that at a certain temperature called the compensation temperature $Tcomp_2$, the two components are equally magnetized and the net magnetization is nil. If the temperature rises further, the net magnetization shifts to the down direction. The net magnetization continues to be oriented in the down direction until the Curie temperature $TC_2$, at which temperature all magnetization is lost.

The composition of the layers is controlled so that the compensation temperature of the reference layer 14 is less than the Curie temperature of the storage layer 12, and the Curie temperature of the storage layer 12 is less than the Curie temperature of the reference layer 14. That is:

$$Tcomp_2 < TC_1 < TC_2$$

FIG. 4 shows the coercivity-temperature characteristics of the two layers. Coercivity is defined as the magnetizing force that must be applied in the opposite direction to demagnetize a magnetic material at a given temperature. The coercivity of the storage layer 12, represented by the curve 31, diminishes from a high value at room temperature to zero at the Curie temperature $TC_1$. The coercivity of the reference layer 14, represented by the curve 32, rises from a low value at room temperature to an infinite value at the compensation temperature $Tcomp_2$, then falls to zero at the Curie temperature $TC_2$.

At temperatures below the compensation temperature $Tcomp_2$ the coercivity of the storage layer 12 is high enough to resist the static magnetizing force exerted by the reference layer 14. At room temperature the coercivity of the reference layer 14 is low enough that it cannot resist the magnetizing force exerted by the storage layer 12, even when this force is opposed by the biasing magnetic field generated by the bias magnet 8. The strength of the magnetic field generated by the storage layer 12 in the reference layer 14 at room temperature must naturally exceed the strength of the biasing magnetic field in the reference layer 14.

The operation of overwriting a bit cell with a new bit value will now be described. At the beginning of the operation, the storage layer 12 and the reference layer 14 in the bit cell are both oriented in the same direction, but it is not necessary to know this direction; that is, it is not necessary to know the old value of the bit.

During the overwriting operation the disk is spun in the direction of the arrow in FIG. 1 so that the bit cell is first illuminated by the erasing beam 4, in the presence of the substantially constant biasing magnetic field. The erasing beam 4 is maintained at a substantially constant intensity level.

The intensity of the erasing beam 4 is high enough that when the bit cell passes through the erasing spot 6, both the storage layer 12 and the reference layer 14 are heated to temperatures exceeding their Curie temperatures $TC_1$ and $TC_2$. The storage layer 12 and the reference layer 14 are therefore both completely demagnetized. When the bit cell leaves the erasing spot 6, first the temperature in the reference layer 14 falls below its Curie temperature $TC_2$ and the reference layer 14 acquires the up orientation of the biasing magnetic field. Next, as cooling proceeds and the temperature falls below the Curie temperature $TC_1$ of the storage layer 12, the magnetic fields generated by the bias magnet 8 and the reference layer 14 magnetize the storage layer 12 in the same (up) direction.

As cooling proceeds further and the temperature falls below the compensation temperature $Tcomp_2$, the net magnetization of the reference layer 14 reverses to the down direction, but at this temperature the coercivity of the storage layer 12 is high enough to resist the downward-oriented magnetic field generated by the reference layer 14, especially since this field is partially canceled by the upward-oriented biasing magnetic field. The storage layer 12 therefore retains its upward magnetic orientation.

Finally, when the temperature of the reference layer 14 approaches room temperature, the coercivity of the reference layer 14 becomes small enough for the reference layer 14 to acquire the magnetic orientation of the fields generated by the bias magnet 8 and the storage layer 12, thus reversing from the down to the up orientation. Both the storage layer 12 and the reference layer 14 are now aligned with the up orientation of the bias magnetic field Hb.

The above cooling process is completed while the bit cell is in transit from the erasing spot 6 to the writing spot 7. The bit cell is thus ready to enter the writing spot 7 during the same revolution of the disk. When the bit cell enters the writing spot 7 it is illuminated by the writing beam 5, the intensity of which is modulated by means of the second beam emitting diode 10 according to the new information to be written, being switched to a low level to write a zero, and to a high level to write a one.

At its low level, the writing beam 5 does not heat the reference layer 14 to its compensation temperature $TComp_2$. Ideally, the writing beam 5 is switched completely off. No magnetic reversal takes place. The storage layer 12 and the reference layer 14 both retain their up orientation, representing a value of zero.

At its high level, the writing beam 5 heats the storage layer 12 to a temperature that exceeds the Curie temperature $TC_1$, and heats the reference layer 14 to a temperature that exceeds the compensation temperature $TComp_2$ but is less than the Curie temperature $TC_2$. Thus the storage layer 12 loses its magnetization, while the reference layer 14 reverses to the down orientation as explained in FIG. 3.

When the bit cell leaves the writing spot 7 and the temperature in the storage layer 12 falls below the Curie temperature $TC_1$, the storage layer 12 acquires the down orientation of the reference layer 14. When the temperature falls further to the compensation temperature $TComp_2$, the reference layer 14 reverses its net magnetization, but the coercivity of the storage layer 12 also rises, becoming strong enough to resist the upward field generated by the reference layer 14. The storage layer 12 thus retains its down orientation.

When the temperature approaches room temperature, the coercivity of the reference layer 14 becomes low enough that the magnetic field generated by the storage layer 12 magnetizes the reference layer 14 in the down orientation. The final result is that both the storage layer 12 and the reference layer 14 are oriented in the down direction, representing a value of one.

Normally an entire track or sector of bits is written at a time. Since the erasing beam 4 erases all bits in the track or sector to the known value imparted by the bias magnet 8, it is not necessary to read the bits before writing them, or to control the writing beam 5 according to the old bit values. The control logic of the magneto-optic disk apparatus can therefore be simpler than in the prior art. Furthermore, highly accurate positioning control is not required because the writing operation starts from a completely erased state. The positioning mechanism of the magneto-optic disk apparatus can therefore be less precise and less expensive than in the prior art.

Examples of the magnetic materials that can be used in the magneto-optic disk 1 are $Tb_{22}Fe_{78}$ for the storage layer 12 and $(Gd_{90}Tb_{10})_{26}Fe_{74}$ for the reference layer 14. $Tb_{22}Fe_{78}$ has a Curie temperature $TC_1$ of 130° C.; $(Gd_{90}Tb_{10})_{26}Fe_{74}$ has a Curie temperature $TC_2$ of 200° C. and a compensation temperature $TComp_2$ of 100° C.

The strength of the biasing magnetic field should be substantially equal to 150 oersteds.

The interval between the erasing spot 6 and the writing spot 7 must be long enough to allow a bit cell to cool to substantially room temperature while in transit between the two spots. In practice a cooling time of several microseconds is adequate. If the magneto-optic disk 1 makes 30 revolutions per second and the tracks 2 are disposed at a distance of 30 to 60 millimeters from the center of the disk, it suffices for the erasing spot 6 to be separated from the writing spot 7 by a distance of, for example, 50 micrometers. This is short enough, so the erasing step does not delay the overwriting process significantly. The rotational speed of the disk 1 may be higher than 30 revolutions per second and as high as about 60 revolutions per second, for example. The separation between the erasing spot 6 and the writing spot 7 may vary over the range of 20 to 100 micrometers, for example.

The scope of this invention is not limited to what is shown in the drawings, but includes many modifications that will be apparent to one skilled in the art. For example, the tracks may be arranged in a spiral rather than a concentric configuration. Also, although FIG. 2 showed a distinct non-magnetic layer separating the storage and reference layers, this separating layer may be incorporated in the storage layer. If the storage and reference layers are formed by deposition in a sputtering device, for example, it suffices to wait a sufficient time for surface of the storage layer to become oxidized before the reference layer is deposited. The oxide prevents exchange coupling between the storage and reference layers.

What is claimed is:

1. A method of overwriting information in circular tracks on a spinning magneto-optic disk, wherein said magneto-optic disk comprises:
   a magnetic storage layer having a Curie temperature $TC_1$ and a first coercivity, and
   a ferrimagnetic reference layer having a compensation temperature $TComp_2$ less than the Curie temperature $TC_1$ of the storage layer, a Curie temperature $TC_2$ and a second coercivity;
   said method comprising the steps of:
   illuminating an erasing spot on said magneto-optic disk with an erasing beam of substantially constant intensity, whereby the storage layer and the reference layer are heated to a temperature higher than their respective Curie temperatures $TC_1$ and $TC_2$;
   illuminating a writing spot on said magneto-optic disk with a writing beam, the intensity of which is modulated between a high level and a low level according to the information to be written,
   providing a single lens which is employed to focus both said erasing beam and writing beam,
   said writing beam at said high level heating the storage layer to a temperature higher than its Curie temperature $TC_1$, and heating the reference layer to a temperature higher than its compensation temperature $TComp_2$ and lower than its Curie temperature $TC_2$, and
   when said writing beam is at said low level, the storage layer is at a temperature lower than its Curie temperature $TC_1$, and the coercivity of the storage layer is greater than the magnetizing force exerted by the reference layer on the storage layer, and the reference layer is at a temperature lower than its compensation temperature $TComp_2$.

2. A method of overwriting information in circular tracks on a spinning magneto-optic disk, wherein said magneto-optic disk comprises:
a magnetic storage layer having a Curie temperature $TC_1$ and a first coercivity, and
a ferrimagnetic reference layer having a compensation temperature $TComp_2$, a Curie temperature $TC_2$ and a second coercivity;
said method comprising the steps of:
illuminating an erasing spot on said magneto-optic disk with an erasing beam of substantially constant intensity, in the presence of a substantially constant biasing magnetic field whereby the storage layer and the reference layer are heated to a temperature higher than their respective Curie temperatures $TC_1$ and $TC_2$;
illuminating a writing spot on said magneto-optic disk with a writing beam, the intensity of which is modulated between a high level and a low level according to the information to be written,
providing a single lens which is employed to focus both said erasing beams and writing beam,
said writing beam at said high level heating the storage to a temperature higher than its Curie temperature $TC_1$, and heating the reference layer to a temperature higher than its compensation $TComp_2$ and lower than its Curie temperature $TC_2$,
when said writing beam is at said low level, the storage layer is at a temperature lower than its Curie temperature $TC_1$, and the reference layer is at a temperature lower than its compensation temperature $TComp_2$, and
wherein at room temperature, the strength of the magnetic field generated by the storage layer in the reference layer exceeds the strength of the biasing magnetic field in the reference layer, and the net magnetic field generated by the storage layer in the reference layer when opposed by the magnetic field generated by the biasing magnetic field in the reference layer exceeds said second coercivity of the reference layer.

3. The method of claim 2, wherein at a certain temperature below the Curie temperature $TC_1$ of the storage layer and above room temperature, the magnetic field generated by the reference layer in the storage layer exceeds the magnetic field generated by the biasing field in the storage layer, and the net magnetic field generated by the reference layer in the storage layer when opposed by the magnetic field generated by the biasing magnetic field in the storage layer exceeds said first coercivity of the storage layer.

4. The method of claim 2, wherein the storage layer comprises $Tb_{22}Fe_{78}$ and the reference layer comprises $(Gd_{90}Tb_{10})_{26}Fe_{74}$.

5. The method of claim 4, wherein the magneto-optic disk is spun at a rate of substantially 30 to 60 revolutions per second, the tracks have maximum radii of substantially 60 mm, and the spot illuminated by the erasing beam is separated from the spot illuminated by the writing beam by a distance of substantially 20 to 100 micrometers.

6. A method of overwriting information on a magneto-optic disk comprising the steps of:
providing a magneto-optic disk comprising a storage layer having a Curie temperature $TC_1$ and a first coercivity, and a reference layer magneto-statically coupled to the storage layer and having a compensation temperature $TComp_2$ lower than the Curie temperature $TC_1$ of the storage layer, and a Curie temperature $TC_2$ higher than the Curie temperature $TC_1$ of the storage layer and a second coercivity;
spinning the disk so that a particular point on the disk moves past a location of erasure and then a location of writing;
applying a bias magnetic field by means of a permanent magnet of a substantially constant strength and direction to the spinning disk at the location of erasure;
illuminating an erasing spot on the spinning disk at the location of erasure with an erasing beam which heats the storage layer and the reference layer of the disk at the location of erasure to a temperature exceeding the Curie temperatures $TC_1$ and $TC_2$ of the storage layer and the reference layer, whereby the storage layer and reference layer lose their magnetization and are magnetized in said direction of the bias magnetic field as they are cooled;
illuminating a writing spot on the spinning disk at a location of writing with a writing beam; the intensity of illumination at the writing spot being modulated between a high level and a low level according to the information to be written;
the intensity of illumination at the writing spot at the high level being such that the storage layer is heated above its Curie temperature $TC_1$ and the reference layer is heated above its compensation temperature $TComp_2$ and below its Curie temperature $TC_2$ whereby the direction of magnetization of the reference layer is reversed as its temperature exceeds its compensation temperature, and during the process of cooling the storage layer is magnetized in the direction of the magnetization of the reference layer;
and the intensity of illumination at the writing spot at the low level being such that the storage layer is at a temperature below its Curie temperature $TC_1$ and the reference layer is at a temperature below its compensation temperature $TComp_2$;
said second coercivity of the reference layer being smaller than the magnetic field generated by the storage layer in the reference layer at room temperature; and
said first coercivity of the storage layer being smaller than the magnetic field generated by the reference layer minus the absolute value of the bias magnetic field in the storage layer at temperatures above the compensation temperature $TComp_2$ of the reference layer and below the Curie temperature $TC_1$ of the storage layer.

7. The method of claim 6, wherein the bias magnetic field means comprises a permanent magnet disposed on a first side of the disk.

8. The method of claim 7, wherein said erasing beam and said writing beam illuminate the disk on a second side opposite to said first side.

9. The method of claim 6, wherein a single lens is employed to focus both the erasing beam and the writing beam.

10. The method of claim 6, wherein the storage layer comprises $Tb_{22}Fe_{78}$ and the reference layer comprises $(Gd_{90}Tb_{10})_{26}Fe_{74}$.

11. The method of claim 6, wherein said step of spinning includes spinning the magneto-optic disk at a rate of substantially 30 to 60 revolutions per second, and said erasing spot illuminated by the erasing beam is separated from the spot illuminated by the writing beam by a distance of substantially 20 to 100 micrometers.

12. The method of claim 6, wherein, during the process of cooling after the heating above the compensation temperature $Tcomp_2$, the storage layer is magnetized in the direction of the magnetization of the reference layer, which is opposite to the direction of magnetization by the bias magnetic field, before the reference layer is cooled to its compensation temperature $Tcomp_2$, and when the temperature of the reference layer falls below the compensation temperature $Tcomp_2$ the direction of magnetization of the reference layer is reversed, and when the two layers are at about room temperature the direction of magnetization of the reference layer is reversed again by the magnetic field of the storage layer.

13. Apparatus for overwriting on a magneto-optic disk comprising a storage layer having a Curie temperature $TC_1$ and a first coercivity, and a reference layer magneto-statically coupled to the storage layer and having a compensation temperature $TComp_2$ lower than the Curie temperature $TC_1$ of the storage layer, and a Curie temperature $TC_2$ higher than the Curie temperature $TC_1$ of the storage layer and a second coercivity;
  means for spinning the disk so that a particular point on the disk moves past a location of erasure and a location of writing;
  bias magnetic field means for applying a bias magnetic field of a substantially constant strength at the location of erasure;
  a first beam emitting device for illuminating an erasing spot on the disk at the location of erasure with an erasing beam which heats the storage layer and the reference layer of the disk at the location of erasure to a temperature exceeding the Curie temperature $TC_1$ of the storage layer and the Curie temperature $TC_2$ of the reference layer, respectively, whereby both storage and reference layers lose their magnetization and are magnetized in the direction of the bias magnetic field as they are cooled; and
  a second beam emitting device for illuminating a writing spot on the disk at the location of writing;
  said second beam emitting device modulating the intensity of illumination at the writing spot between a high level and a low level according to the information to be written;
  the intensity of illumination at the writing spot at the high level being such that the storage layer is heated above its Curie temperature $TC_1$ and the reference layer is heated above its compensation temperature $TComp_2$ and below its Curie temperature $TC_2$ and during the process of heating the direction of the reference layer is reversed as its temperature exceeds its compensation temperature, and during the process of cooling the storage layer is magnetized in the direction of the magnetization of the reference layer;
  and the intensity of illumination at the writing spot at the low level being such that the storage layer is at a temperature below its Curie temperature $TC_1$ and the reference layer is at a temperature below its compensation temperature $TComp_2$;
  the coercivity of the reference layer being smaller than the magnetic field generated by the storage layer in the reference layer at room temperature;
  said first coercivity of the storage layer being smaller than the magnetic field generated by the reference layer minus the absolute value of the bias magnetic field in the storage layer at a temperature above the compensation temperature $TComp_2$ of the reference layer and below the Curie temperature $TC_1$ of the storage layer.

14. The apparatus of claim 13, wherein the bias magnetic field means comprises a permanent magnet disposed adjacent to and facing a first side of the disk.

15. The apparatus of claim 14, wherein the first beam emitting device and the second beam emitting device illuminate the disk on a second side opposite to the first side.

16. The apparatus of claim 13, wherein a single lens is employed to focus both the erasing beam and the writing beam.

17. The apparatus of claim 13, wherein the storage layer comprises $Tb_{22}Fe_{78}$ and the reference layer comprises $(Gd_{90}Tb_{10})_{26}Fe_{74}$.

18. The apparatus of claim 17, wherein the magneto-optic disk is spun at a rate of substantially 30 to 60 revolutions per second, the tracks have maximum radii of substantially 60 mm, and the spot illuminated by the erasing beam is separated from the spot illuminated by the writing beam by a distance of substantially 20 to 100 micrometers.

19. The method of claim 13, wherein, during the process of cooling after the heating above the compensation temperature $Tcomp_2$, the storage layer is magnetized in the direction of the magnetization of the reference layer, which opposite to the direction of magnetization by the bias magnetic field, before the reference layer is cooled to its compensation temperature $Tcomp_2$, and when the temperature of the reference layer falls below the compensation temperature $Tcomp_2$ the direction of magnetization of the reference layer is reversed, and when the two layers are at about room temperature the direction of magnetization of the reference layer is reversed again by the magnetic field of the storage layer.

20. The method of claim 11, wherein said magneto-optic disk has tracks having a maximum radii of substantially 60 mm.

21. A method of overwriting information in a track of a magneto-optic disk, said disk comprised of storage and reference layers having first and second magnetizations, said storage layer having a Curie temperature $TC_1$, said reference layer having a compensation temperature $TComp_2$ less than the Curie temperature of the storage layer, and a Curie temperature $TC_2$ greater than the Curie temperature of the storage layer, said method comprising the steps of:
  applying an external, substantially constant biasing magnetic field by means of a permanent magnet having a predetermined direction;
  illuminating an erasing spot in said track on the magneto-optic disk with an erasing beam of substantially constant intensity whereby both said first and second magnetizations of said storage and reference layers of said disk is removed;
  cooling said erasing spot whereby said storage and reference layers are magnetized in the direction of said biasing magnetic field;
  illuminating a writing spot on said track with a writing beam, the intensity of which is modulated between a high level and a low level according to the information to be written, said high level causing said first magnetization of said storage layer to be removed, the intensity of illumination at the low level being such that the temperature of the reference layer is lower than its compensation temperature and the coercivity of the storage layer is greater than the magnetizing force exerted by the reference layer, said writing occurring during the same revolution of the magneto-optic disk.

22. An apparatus for overwriting information on a magneto-optic disk comprising a storage layer having a first magnetization, and a reference layer having a second magnetization and magneto-statically coupled to the storage layer, said storage layer having a Curie temperature $TC_1$, said reference layer having a compensation temperature $TComp_2$ less than the Curie temperature of the storage layer, and a Curie temperature $TC_2$ greater than the Curie temperature of the storage layer, said method comprising the steps of:

permanent magnet means disposed adjacent said disk for applying a bias magnetic field of a substantially constant strength;

a first beam emitting device for illuminating an erasing spot on the disk with an erasing beam which heats said storage layer and said reference layer to a temperature at which said first and second magnetizations are removed;

a second beam emitting device for illuminating a writing spot on the disk;

said second beam emitting device modulating the intensity of illumination on said writing spot between a high level and a low level according to information to be written;

said intensity of illumination at the high level heating said storage layer and said reference layer whereyby the direction of said second magnetization in the reference layer is reversed and said first magnetization of the storage layer is removed; and said intensity of illumination at the writing spot at the low level being such that the directions of magnetization of the reference and storage layers remain substantially unaltered, and the coercivity of the storage layer is greater than the magnetizing force exerted by the reference layer.

23. The method of claim 1 further comprising a step of applying an external, substantially constant biasing magnetic field by means of a permanent magnet.

* * * * *